United States Patent [19]
Wright et al.

[11] 3,729,814
[45] May 1, 1973

[54] METHOD FOR MAKING A COMPOSITE

[75] Inventors: Archibald N. Wright; Wilfred F. Mathewson, both of Schenectady, N.Y.

[73] Assignee: General Electric Company, Schenectady, N.Y.

[22] Filed: July 1, 1971

[21] Appl. No.: 158,804

Related U.S. Application Data

[63] Continuation-in-part of Ser. No. 812,262, April 1, 1969, Pat. No. 3,619,259, which is a continuation-in-part of Ser. No. 628,447, April 4, 1967, abandoned.

[52] U.S. Cl. ..............29/577, 29/25.42, 117/93.31
[51] Int. Cl. ..............................................B01j 17/00
[58] Field of Search .....................29/577; 117/93.31

[56] References Cited

UNITED STATES PATENTS

| | | | |
|---|---|---|---|
| 3,619,259 | 11/1971 | Wright | 117/93.31 |
| 3,397,447 | 8/1968 | Currin et al. | 29/577 |
| 3,423,821 | 1/1969 | Nishimura | 29/577 X |

Primary Examiner—Charles W. Lanham
Assistant Examiner—W. Tupman
Attorney—John F. Ahern et al.

[57] ABSTRACT

Thin, continuous films can be formed on various substrates by the ultraviolet surface polymerization of the vapor of a N-substituted maleimide or bis-maleimide. The films are useful as coatings on metallic and nonmetallic substrates, capacitor dielectrics, insulation for microelectric devices, insulation on electrically conductive wire, and for corrosion protection.

5 Claims, 3 Drawing Figures

Patented May 1, 1973

INVENTORS:
ARCHIBALD N. WRIGHT
WILFRED F. MATHEWSON, Jr.
by William A. Teoli
THEIR ATTORNEY

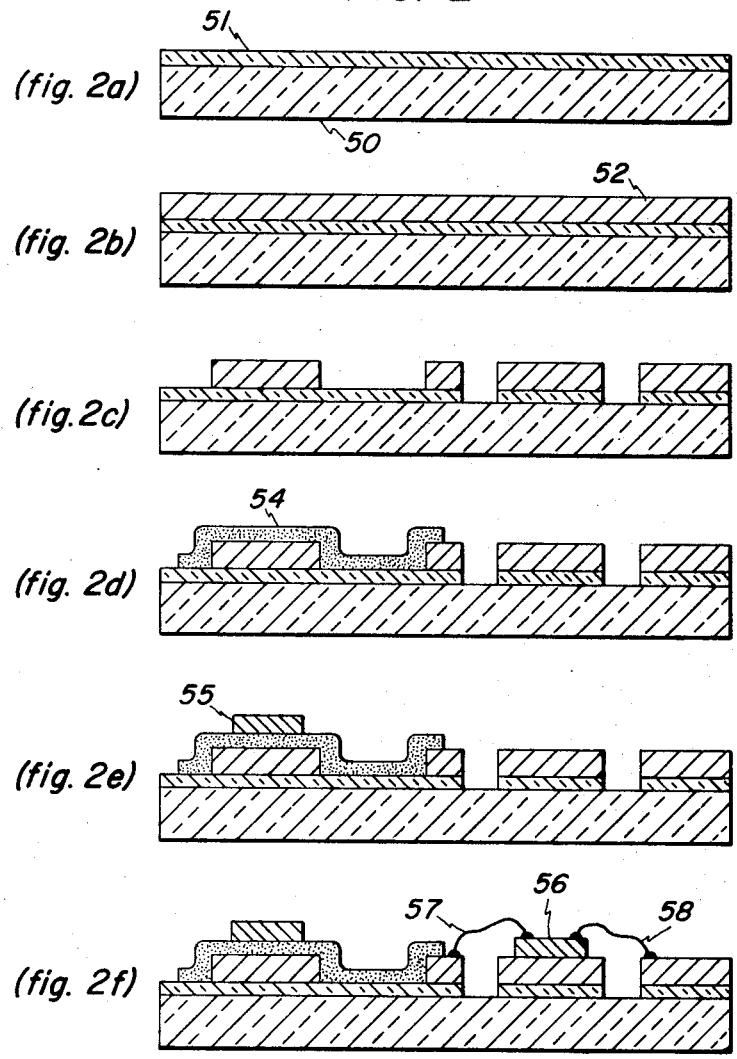
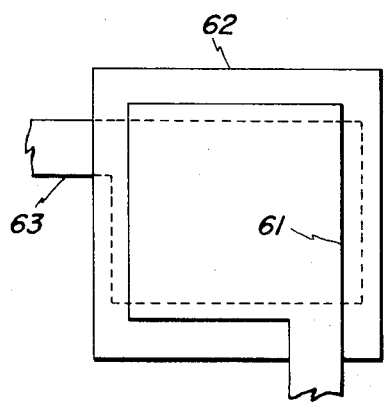

METHOD FOR MAKING A COMPOSITE

This application is a continuation in part of Ser. No. 812,262, filed Apr. 1, 1969, now U.S. Pat. No. 3,619,259, which is a continuation in part of Ser. No. 628,447, filed Apr. 4, 1967, now abandoned, which applications are assigned to the same assignee as the present invention.

The present invention relates to a method for making a hydbrid circuit array using a thin surface photopolymerized N-substituted maleimide film as a dielectric or passivating layer on a substrate.

Films which can be configuratively deposited are desirable for a wide variety of applications. It is further desirable that films and coatings be adherent when formed on a substrate and continuous thereon. The present invention is directed to such improved films, coatings and composites of such films or coatings which exhibit the above-desirable characteristics and to methods of forming such films, composites and coatings, and products made therefrom. The continuous films are formed by the ultraviolet surface photopolymerization of the vapor of a N-substituted maleimide, such as N-phenyl maleimide.

The N-substituted maleimides which can be employed in the practice of the invention preferably have the formula, (1) 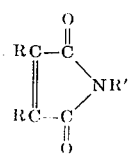

where R is selected from hydrogen and alkyl radicals, and R' is selected from hydrogen and monovalent hydrocarbon radicals. Bismaleimides also can be used in the practice of the invention which include compounds of the formula, (2) 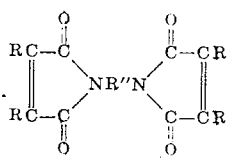

where R is defined above, and R'' is a divalent organic radical.

Radicals included by R are, for example, hydrogen and alkyl radicals, such as methyl, ethyl, propyl, butyl, pentyl, hexyl, and octyl. Radicals included by R', are for example, hydrogen and all of the aforementioned alkyl radicals of R, preferably, R' is selected from aryl radicals and halogenated aryl radicals, such as phenyl, chlorophenyl, tolyl, xylyl, naphthyl, etc. Radicals included by R'' are, for example, alkylene radicals, such as ethylene, propylene, butylene, etc.; arylene radicals, such as phenylene, chlorophenylene, tolyene, naphthylene, anthrylene, etc. and R''' Y R''' radicals, where R''' is selected from the arylene radicals, as previously defined, and Y is a divalent radical selected from alkylene as previously defined,

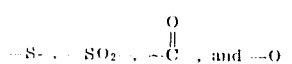

Among the maleimides of Formula 1 which can be employed in the practice of the invention are, for example, maleimide, N-methylmaleimide, N-vinylmaleimide, N-phenyl-maleimide, etc.; imide derivatives of citraconic anhydride, such as methylmaleimide, methyl, N-methylmaleimide, methyl, N-phenylmaleimide, dimethyl, N-phenylmaleimide, etc.

Among the bismaleimides of Formula 2 there are included, for example, methylene dianiline bismaleimide, and bismaleimides shown by the following formulas,

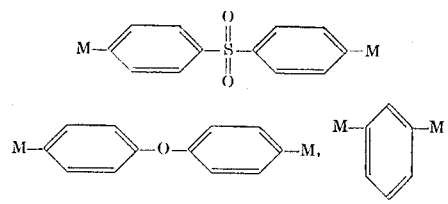

etc., where M is selected from

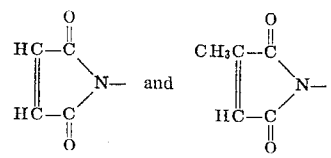

The films of the present invention can be configuratively deposited to provide for such advantages as integrated circuitry. In addition, these films are continuous and adherent, have high dielectric strength, and dielectric constants, are imperforate, exhibit good temperature stability, and have mechanical and electrical continuity at a thickness less than 1,000 angstroms, for example, as low as 125 angstroms. Preferably, the films provided by the method of the invention can have a thickness of from 1,000 to 25,000 angstroms, while a thickness of from 125 angstroms to 100,000 angstroms can be employed. Coatings formed in accordance with the invention exhibit good chemical resistance. These films and coatings are useful for a wide variety of applications including covering layers for various metallic and nonmetallic substrates, capacitor dielectrics, cryogenic device insulation, insulation for microelectric devices, primer or insulation on electrically conductive wire, and for corrosion protection. When employed as enamel or insulation on electrically conductive wire, the coatings made in accordance with the invention can be utilized, for example, as a primary dielectric layer in combination with inorganic barrier material, such as mica reinforced woven glass tape bonded directly to the conductor with a silicone resin adhesive. Films and coatings formed in accordance with our invention are also useful on diamonds, on cubic boron nitride (known as borazon) which is diclosed and claimed in U.S. Pat. No. 2,947,617.

The present invention is based on a discovery that the vapor of an imide-containing photopolymerizable organic maleimide can be converted to high temperature resistant supported films, coatings, or unsupported films, by surface photopolymerization with ultraviolet light. Unsupported films can be made by effecting polymerization of the vapor of a N-substituted maleimide containing organic material on the surface of a substrate, for example, a metal substrate, followed by removal of the substrate by techniques such as etching.

In accordance with the invention, there is provided a method which comprises effecting the formation of a continuous, imperforate temperature-resistant flexible film on the surface of a substrate by the ultraviolet surface photopolymerization of the vapor of N-substituted photopolymerizable maleimide, as previously defined.

In order to fully understand the invention, reference can be made to the accompanying drawing and the following description in which:

FIG. 2 shows how the practice of the present invention can be applied to make a hybrid circuit array having a capacitor electrically connected to a silicon chip.

FIG. 3 is a detail of the capacitor in the circuit array in FIG. 2.

Figure 1:
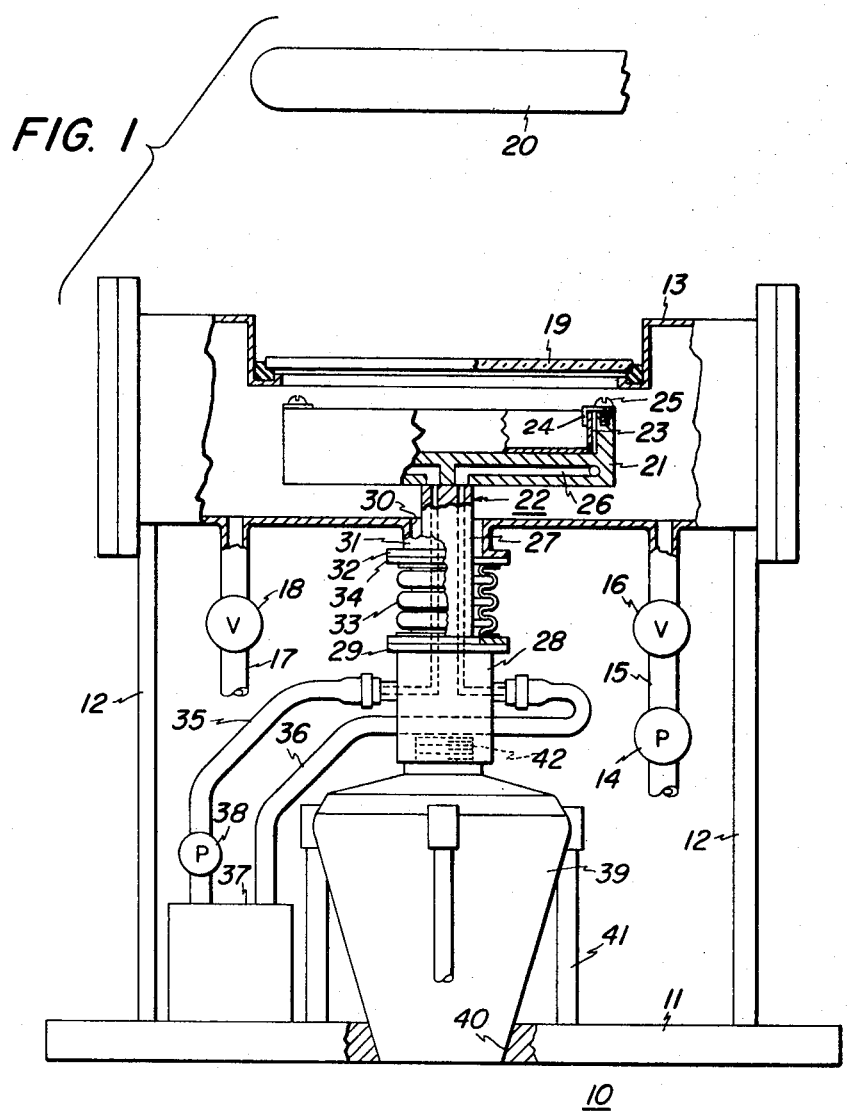
FIG. 1 is a side elevational view partially in section of apparatus for forming films, coatings and products in accordance with our invention.

More particularly, in FIG. 1 of the drawing, an apparatus is shown generally at 10 for forming films, coatings and products having such films or coatings thereon in accordance with our invention. A base 11 is provided on which is mounted a pair of support members 12. An enclosure is positioned upon support members 12. A vacuum pump 14 is connected by a line 15 to enclosure 13 to evacuate the latter. A control valve 16 is provided in evacuation line 15. An inlet line 17 is connected at one end to enclosure 13 and at its other end to a source (not shown) of material to be supplied in gaseous form to enclosure 13. A control valve 18 is provided in line 17 to control the supply of material to enclosure 13. An ultraviolet light transmitting window 19 is shown positioned in the upper wall portion of enclosure 13 and is removed therefrom.

An ultraviolet light 20, which is normally provided with a relector (not shown), is shown outside and spaced above enclosure 13 in alignment with window 19. However, light 20 can be positioned inside enclosure 13. Light 20 is supported in any suitable manner. Such a light source can provide ultraviolet light in the region of up to about 3,500 angstroms, and which is directed by its reflector (not shown) through window 19 into enclosure 13. It is preferred to employ ultraviolet light in the wave-length range of between 1,800 to 3,000 angstroms. A metal hood (not shown) is also positioned around the enclosure and light source. A substrate support member 21 is positioned within enclosure 13 and connected to the driven end of a driver shaft 22. A tray or container 23 is located within the upper recessed portion of member 21 to provide a container for material to be used during the operation of apparatus 10. Brackets 24 are shown at opposite ends of tray 23, which brackets are fastened by means of screws 25 to support member 21. A cooling tube 26 is imbedded in substrate support member 21 to provide cooling for the member, associated tray 23 and material placed in tray 23.

Since apparatus 10 is useful for coating diamonds, borazon and other particle material, there is provided a driver shaft 22 which has an upper drive portion 27 and a lower driven portion 28. Driver portion 27 of shaft 22 has a smaller diameter than driven portion 28. Shaft 22 is shown with a flange 29 at the junction of portions 27 and 28. Driven portion 27 of shaft 22 extends through an aperature 30 in the wall of enclosure 13. A closure 31 with an associated flange 32 extends outwardly from and surrounds aperature 30. A diaphragm 33 with a flange 34 at each end is connected by means of these flanges to associated flange 32 of closure 31 and to flange 29 on driver shaft 22. In this manner, a vacuum can be maintained in enclosure 13 while shaft 22 can be vibrated. Tube 26 within substrate support member 21 continues through the interior of shaft 22 and is connected to an inlet tube 35 and an outlet tube 36. Tubes 35 and 36 are connected to a cooling unit 37 which is shown positioned outside enclosure 13 and supported on base 31. Unit 37 consists of, for example, a dewar flask in which is positioned a coil connected to he ends of tubes 35 and 36, and which is filled with ice. A thermometer (not shown) is positioned in the ice to record the temperature within unit 37. Other cooling units, such as a heat exchanger or a refrigeration device, can also be employed. A circulating pump 38 is connected to inlet tube 35 to circulate a coolant through tube 35, tube 26 and outlet tube 36. A wide variety of coolants might be employed, for example, water or ethanol.

A vibrating device 39 is shown positioned in a recess 40 in base 11. A plurality of support members 41 are attached to base 11 and to device 39 to position the device. The upper end of device 39 fits into a recess 42 in the end of a driven portion 28 of shaft 22. For example, a multi-impedance driver unit might be employed for device 39.

In FIG. 2, a there is shown a substrate 50, which can be rigid such as ceramic or flexible for example, Kapton film or Mylar film. Another flexible substrate can be aluminum foil having a polyimide coating made by dip-coating the aluminum foil into a polyamide acid followed by heating. A vapor deposited resistive metal layer 51, such as chromium or nichrome can be deposited on the surface of substrate 50, gold conductor film can be vapor deposited on the resistive metal layer as shown by 52 in b. The gold can be selectively etched as shown by c, utilizing a standard photoresist technique, to form resistors, conductors, chip mounting pads, interconnections and bottom capacitor electrodes.

In d, an ultraviolet surface photopolymerized film 54 of N-phenyl maleimide is formed over the capacitor electrodes and resistors to serve as a capacitor dielectric and a resistor passivator. There is then vapor deposited as shown by e a patterned conductor film, 55 such as aluminum through a stencil mask to form top capacitor electrodes. Active silicon devices, such as gold silicon perform, or a gold germanium perform can be die maintained as shown by f, respectively, at about 370°C or about 356°C. At 56 there is shown the chip interconnected to the substrate pad which can be achieved with standard gold wires, 57 and 58, bonding techniques when preheated to around 310°C.

In FIG. 3 there is shown a detail of the capacitor element of the circuit array shown in FIG. 2, where 61 is the top electrode, 62 is the N-phenyl maleimide film and 63 is the bottom electrode.

It is preferred to employ ultraviolet light having a wave-length in the range of 1,800 angstroms to 3,000 angstroms, while up to 3,500 angstroms can be employed. A vapor pressure of the N-substituted maleimide can be in the range of from 0.1 to 4.0 millimeters of mercury.

In an illustrative operation of the apparatus shown in FIG. 1 of the drawing, vacuum pump 24 can be started and pumped down the chamber defined by enclosure 13 to a pressure of about one micron. Valve 16 can then be closed. A N-substituted photopolymerizable maleimide in vaprous form can be supplied from a solid source (not shown), such as N-phenyl maleimide, which is positioned in an area which will be shaded in enclosure 13.

The N-phenylmaleimide can be heated by a suitable heating source (not shown) to about 205°C to provide a vapor pressure of about 100 microns. Ultraviolet lamp 20 is shown positioned outside and in alignment with window 19 and substrate support member 21. However, lamp 20 can be positioned inside enclosure 13. In the latter event, no additional heating source is required to vaporize the solid material. The lamp, which can have an effective wave length in the range of 2,000 to 3,500 angstroms, is turned on whereby the temperature of the substrate support member 21 increases and the vapor pressure rises. A metal hood (not shown) is positioned around apparatus 10 since this particular light source is used.

In order that those skilled in the art will be better able to practice the invention, the following examples are given by way of illustration and not by way of limitation. All parts are by weight.

EXAMPLE 1

Several capacitors were made in accordance with the practice of the invention following the procedure shown in U.S. Pat. No. 3,521,339 Wright et al., assigned to the same assignee as the present invention. In preparing these capacitors, the apparatus of FIG. 1, as described above, was employed. Aluminum was evaporated onto glass to make the first electrode onto which there was configurationally photodeposited on imide containing photopolymerizable organic material. Aluminum was then evaporated configurationally onto the surface of the imide film. A pair of leads were connected to the respective aluminum electrodes. Table I shows the imides photodeposited, the thicknesses of the films, and some of the characteristics of the result capacitors as measured on a type 1650–A General Radio Company impedance bridge. A signal of 1,000 cycles per second was employed to measure the percent dissipation factor.

TABLE I

| | Imide | Average Film Thickness Angstroms |
|---|---|---|
| Example 7 | P-tolylmaleimide | 6,850 |
| 8 | N-phenylphthalimide | 480 |
| 9 | N-vinylphthalimide | 8,550 |
| 10 | methylenedianilinebismaleimide | 525 |
| 11 | N-phenyltetrahydrophthalimide | 332 |
| 12 | N-allylphthalimide | 6,150 |
| 13 | N-phenylmaleimide | 9,750 |

TABLE I (continued)

| | Capacitance in Picofarads | % Dissipation Factor at 25°C |
|---|---|---|
| EXAMPLE 7 | 500 | 0.20 |
| 8 | 7,100 | 0.50 |
| 9 | 400 | 0.35 |
| 10 | 6,500 | |
| 11 | 1,020 | 0.4 |
| 12 | 550 | 0.45 |
| 13 | 350 | 0.20 |

Some of the above capacitors were then heated at temperatures up to 300°C for extended periods of time to determine their ability to resist change in percent dissipation factor (%DF) which were measured after the capacitors had cooled to room temperature. As distinguished from dielectric film made from butadiene, which changes abruptly in %DF at about 162°C, the capacitors made from the imide containing photopolymerizable organic material showed little or no change from their original room temperature values after experiencing temperatures as high as 300°C.

The results obtained with N-phenylmaleimide, "N-phenyl," and N-vinylphthalimide, "N-vinyl" as compared to butadiene, "$C_4H_6$" with respect to changes in %DF as defined above are shown in the following table:

| | %DF Initial | After 24 hrs. at 200°C |
|---|---|---|
| N-phenyl | 0.42 | 0.36 |
| N-vinyl | 0.35 | 0.35 |
| $C_4H_6$ | 0.5 | <10% |

Although the above are room temperature values taken after the heating period, the %DF of the N-phenyl was found to remain about 1.7 at 200°C over the 24-hour heating period. The butadiene capacitor was found to continuously increase in %DF when measured at about 162°C.

The capacitor having the N-phenylmaleimide dielectric was then subjected to an extended heat treatment at 300°C to determine its ability to resist change in %DF and capacitance which was subsequently measured at room temperature. The results are shown as follows:

| | 3½ hrs. | 6 hrs. | 22½ hrs. |
|---|---|---|---|
| Capacitance Picofarads | 630 | 650 | 830 |
| %DF | 0.15 | 0.14 | 0.17 |

As shown above, dielectric films made from N-phenyl maleimide are capable of maintaining their electrical properties at high temperatures over extended periods of time. Those skilled in the art would know that this superior ability to resist change at elevated temperature also would qualify imide films or coatings made in accordance with the practice of the invention as high temperature insulation on electrical conductors either as an enamel or as an overcoat or undercoat structure in combination with barrier layers such as mico-reinforced woven glass tape, asbestos, quartz, etc.

EXAMPLE 2

As shown in FIG. 2, utilizing the apparatus of FIG. 1, there is vapor deposited a chromium metal layer on the surface of a polyimide substrate to a thickness of about 300 angstroms. The polyimide substrate is an aluminum foil which has been dip-coated into a polyamide acid such as in Holub U.S. Pat. No. 3,435,002, assigned to the same assignee as the present invention. Thereafter a gold conducting layer is vapor deposited onto the chromium layer to a thickness of about 50,000 angrstroms. The resulting composite is then treated with KMER, photoresist by spinning the resist onto the surface of the gold layer. A mask is employed to pattern the surface of the photoresist which is exposed and developed by conventional means.

As shown by FIG. 2, the gold layer is then etched utilizing a conventional gold etchant. In accordance with the method of the invention, N-phenyl maleimide film is then surface photopolymerized onto the gold layer to a thickness of approximately 12,000 angstroms to produce a composite of N-phenyl maleimide and gold anchored onto the polyimide substrate by the chromium layer. Aluminum is then vapor deposited onto the N-phenyl maleimide film employing a mask utilizing the apparatus of FIG. 1, from a top electrode at 350°C.

A silicon chip is then mounted at 350°C to the gold layer as shown in $f$ of FIG. 2. The silicon chip is electrically connected to the bottom electrode of the capacitor by thermally bonding the top of the silicon chip to the bottom capacitor electrode by means of a gold wire. There is produced a micro electronic circuit array by this procedure.

Those skilled in the art know that the above procedure provides significant advantage over conventional methods of making integrated circuits since it allows for the use of a flexible aluminum-polyimide composite as a substrate. As a result, the method of the present invention can be employed to produce integrated circuits in a continuous manner by utilizing a polyimide coated aluminum roll as a substrate, which can be fed in a continuous manner through an apparatus providing the conditions shown in FIG. 1.

We claim:
1. A method for making an integrated circuit which comprises
   1. selectively surface photopolymerizing and N-substituted maleimide onto a surface of a first electrode selectively mounted on a non-conducting substrate to produce an imide-film first electrode composite,
   2. selectively vapor depositing a second electrode onto said imide film to produce a capacitor and
   3. mounting a silicon chip on a different part of said non-conducting substrate
   4. connecting said silicon chip to said capacitor with a gold wire
   5. heating said capacitor-silicon chip array to a temperature sufficient to electrically bond said capacitor to said silicon chip.

2. A method in accordance with claim 1, where the N-substituted maleimide is N-phenylmaleimide.

3. A method in accordance with claim 1, where said capacitor and said silicon chip are on a common flexible substrate.

4. A method in accordance with claim 3, where said flexible substrate is a polyimide coated aluminum foil.

5. A method in accordance with claim 1, where said capacitor has a first gold electrode in contact with a vapor deposited layer of nichrome, or chromium.

* * * * *